United States Patent
Aikoh et al.

[11] Patent Number: 6,100,913
[45] Date of Patent: Aug. 8, 2000

[54] METHOD OF CORRECTING THE AMOUNTS OF EMITTED LIGHT

[75] Inventors: Yoshihisa Aikoh; Minoru Teshima, both of Tokyo, Japan

[73] Assignee: Oki Data Corporation, Tokyo, Japan

[21] Appl. No.: 08/852,457

[22] Filed: May 7, 1997

[30] Foreign Application Priority Data

May 10, 1996 [JP] Japan ................................. 8-116628

[51] Int. Cl.⁷ .................................................. B41J 2/435
[52] U.S. Cl. .......................................................... 347/237
[58] Field of Search .................................. 347/237, 238, 347/130, 246, 247

[56] References Cited

U.S. PATENT DOCUMENTS

| 5,586,055 | 12/1996 | Ng et al. | 347/238 |
| 5,699,103 | 12/1997 | Fleming | 347/238 |
| 5,774,165 | 6/1998 | Nakajima et al. | 347/246 |

FOREIGN PATENT DOCUMENTS

4-77274  3/1992  Japan .

*Primary Examiner*—N. Le
*Assistant Examiner*—Lamson D. Nguyen
*Attorney, Agent, or Firm*—Akin, Gump, Strauss, Hauer & Feld, L.L.P.

[57] ABSTRACT

A method is used for correcting amounts of light of light emitting elements. A first correction range is defined which has a median of maximum and minimum values of the amounts of light of the light emitting elements, and includes a predetermined number of first subdivided ranges. If the minimum amount of light is not within the first correction range, a second correction reference is produced which is smaller than the first correction reference by a predetermined fraction of the difference between the maximum and minimum values. Then, a second correction range is defined which includes the minimum amount of light, has the second correction reference in its middle, and includes a predetermined number of second subdivided ranges. The amounts of light are corrected by increasing the amount of light if the measured amount of light is smaller than the second correction reference and decreasing the amount of light if the measured amount of light is larger than the second correction reference, the amounts of light being increased or decreased by the correction value corresponding to the second subdivided range. The first correction range may be set to include the minimum and maximum values therein, and the first and second subdivided ranges may progressively widen as the first subdivided ranges becomes increasingly far away from the first correction reference.

11 Claims, 8 Drawing Sheets

TABLE. II

| i-th DEVIATION $P_{bi}$ IN PERCENT | CORRECTION VALUE | CORRECTION DATA (4-BIT) |
|---|---|---|
| $+23 < P_{bi}$ | -21% | 09 |
| $+19 \leq P_{bi} \leq +23$ | -21% | 09 |
| $+15 \leq P_{bi} < +19$ | -17% | 0A |
| $+11 \leq P_{bi} < +15$ | -13% | 0B |
| $+7 \leq P_{bi} < +11$ | -9% | 0C |
| $+5 \leq P_{bi} < +7$ | -6% | 0D |
| $+3 \leq P_{bi} < +5$ | -4% | 0E |
| $+1 \leq P_{bi} < +3$ | -2% | 0F |
| $-1 \leq P_{bi} < +1$ | 0% | 00 |
| $-3 \leq P_{bi} < -1$ | +2% | 01 |
| $-5 \leq P_{bi} < -3$ | +4% | 02 |
| $-7 \leq P_{bi} < -5$ | +6% | 03 |
| $-9 \leq P_{bi} < -7$ | +8% | 04 |
| $-13 \leq P_{bi} < -9$ | +11% | 05 |
| $-17 \leq P_{bi} < -13$ | +15% | 06 |
| $-21 \leq P_{bi} < -17$ | +19% | 07 |
| $-25 \leq P_{bi} < -21$ | +23% | 08 |
| $P_{bi} < -25$ | +23% | 08 |

TABLE. I

| i-th DEVIATION $P_{bi}$ IN PERCENT | CORRECTION VALUE | CORRECTION DATA (4-BIT) |
|---|---|---|
| $+15 < P_{bi}$ | -14% | 09 |
| $+13 \leq P_{bi} \leq +15$ | -14% | 09 |
| $+11 \leq P_{bi} < +13$ | -12% | 0A |
| $+9 \leq P_{bi} < +11$ | -10% | 0B |
| $+7 \leq P_{bi} < +9$ | -8% | 0C |
| $+5 \leq P_{bi} < +7$ | -6% | 0D |
| $+3 \leq P_{bi} < +5$ | -4% | 0E |
| $+1 \leq P_{bi} < +3$ | -2% | 0F |
| $-1 \leq P_{bi} < +1$ | 0% | 00 |
| $-3 \leq P_{bi} < -1$ | +2% | 01 |
| $-5 \leq P_{bi} < -3$ | +4% | 02 |
| $-7 \leq P_{bi} < -5$ | +6% | 03 |
| $-9 \leq P_{bi} < -7$ | +8% | 04 |
| $-11 \leq P_{bi} < -9$ | +10% | 05 |
| $-13 \leq P_{bi} < -11$ | +12% | 06 |
| $-15 \leq P_{bi} < -13$ | +14% | 07 |
| $-17 \leq P_{bi} < -15$ | +16% | 08 |
| $P_{bi} < -17$ | +16% | 08 |

METHOD OF CORRECTING THE AMOUNTS OF EMITTED LIGHT

BACKGROUND OF THE INVENTION

The present invention relates to a method of correcting the amount of light emitted from, for example, light emitting diodes (LEDs) of a head using LEDs, (referred to as LED head hereinafter), the LED head for use in an electrophotographic recording apparatus.

DESCRIPTION OF RELATED ART

An LED head used in an electrophotographic printer typically includes 4,992 LEDs for printing on A4 size paper. The amount of light emitted by each LED varies from LED to LED. Variations of the amount of emitted light causes variation of density in the printed output. In order to provide acceptable print quality, the amounts of light emanating from the individual LEDs must be corrected or adjusted for uniform distribution of light across the LED head.

With one conventional method of correcting the amounts of light emitted from an LED head, LEDs are energized one at a time to measure the amount of light emitted from each LED. Then, maximum and minimum values of the emitted light are determined from the measured amounts of emitted light of all the LEDs. The variations of the amount of emitted light are determined in terms of a difference between the amount of emitted light of each LED and the median of the maximum and minimum values of emitted light. The measured light differences are converted into correction data so that each LED is subsequently supplied with a drive current corresponding to the correction data. In this manner, a uniform distribution of emitted light across the LED head is obtained.

Figure 9:
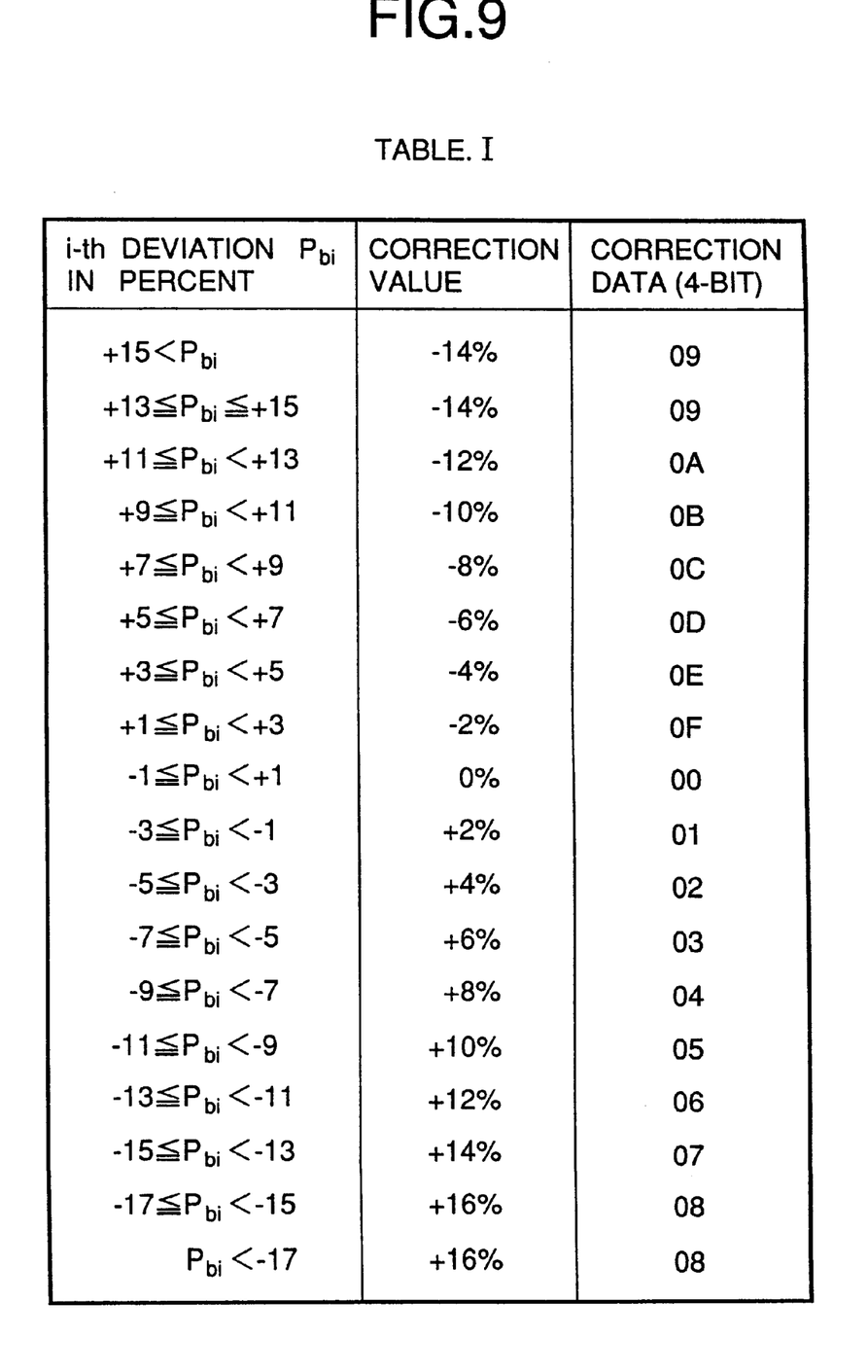
FIG. 9 shows Table I which lists correction values used in a conventional method and in the first embodiment.

FIG. 9 illustrates Table I which lists correction values used in a conventional method of LED light correction. The correction values (column 2) are expressed in the form of 4-bit data (column 3) in increments of 2%. The amounts of light emitted from diodes within the correction range in Table I are corrected to within ±1% with respect to the median amount of light. The positive values of Pbi shown in column I (where the Pbi are the differences between the uncorrected amount of light from each LED and the median value of light and normalized with respect to the median value) indicate that the uncorrected amounts of light are larger than the median and the negative values indicate that the uncorrected amounts of light are smaller than the median.

The aforementioned conventional method using the 4-bit correction data covers only a range in which corrections are made in 16 levels with increments of 2%. The amount of light is corrected downward only by a maximum of −14% if the amount of light falls in the region higher than the correction range of 16 levels (i.e., −17% to +15%), and upward by a maximum of +16% if the amount of light falls in the region lower than the correction range. If the amount of light after correction is still not enough, then printed dots are not dark enough in the black-and-white print, causing white thin lines to appear in the print. White thin lines are noticeable while black thin lines are not. Thus, white thin lines present a problem of poor print quality.

SUMMARY OF THE INVENTION

An object of the invention is to provide a method of correcting the amounts of light emitted from, for example, LEDs in an LED head for use in an electrophotographic printer, so that the amounts of light are uniformly distributed across the head.

Another object of the invention is to provide a method of correcting the amounts of light emitted from the LEDs in the LED head so that white thin lines will not appear in the print.

Still another object of the invention is to provide a method of correcting the amounts of light emitted from the LEDs in the LED head so that correction can be effected by using a limited number of correction levels within a correction range.

Yet another object of the invention is to provide a method of correcting the amounts of light emitted from the LEDs wherein the correction range is effectively widened using the same number of correction values.

A method is used for correcting amounts of light emitted from a plurality of light emitting elements. An amount of light is measured from each of the plurality of light emitting elements. A first correction reference is defined which is based on the amounts of light emitted from the light emitting elements. A first correction range has an upper limit and a lower limit, the first correction reference being substantially in the middle thereof and including a predetermined number of first sub-divided ranges between the upper limit and the lower limit. The correction range is such that the difference between the first correction reference and the amount of light emitted from each of the plurality of light emitting elements within the correction range falls within a first predetermined range. If the minimum value of the amount of light emitted from each of the plurality of light emitting elements is within the first correction range, a first correction value is determined for each of the corresponding sub-divided ranges, the correction value being such that difference between the correction reference and the amount of light emitted from each of the light emitting elements in the correction range after correction is within a second predetermined range. The amounts of light emitted from the light emitting elements in each of the sub-divided ranges are then corrected in accordance with the first correction value. If the minimum value of the amount of light emitted from each of the plurality of light emitting elements is not within the first correction range, a second correction range is defined by shifting the first correction range toward the minimum value by a predetermined quantity. The second correction range has a predetermined number of second sub-divided ranges and a second correction reference, obtained by shifting the first correction reference by the predetermined quantity. A second correction value is determined for each of the second sub-divided ranges and the amounts of light are corrected in accordance with the second correction value.

In another embodiment, the sub-divided ranges have a progressively larger size as the upper limit and the lower limit of the correction range are approached.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The preferred embodiments of the invention will be described in detail with reference to the accompanying drawings. The embodiments are described with reference to an LED head used as a light-emitting element in an electrophotographic printer.

First Embodiment

Figure 1:
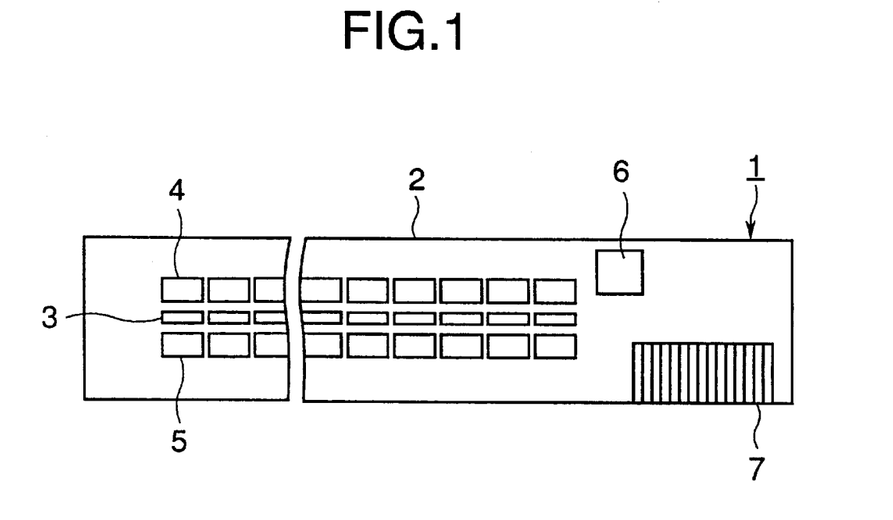
FIG. 1 is a top view of an LED head according to a first embodiment of the invention.

FIG. 1 is a top view of an LED head according to a first embodiment of the invention.

Referring to FIG. 1, an LED head 1 includes a circuit board 2 on which LED chips 3, driver ICs 4 for odd numbered LEDs, and driver ICs 5 for even numbered LEDs are mounted. Each LED chip 3 includes 128 LEDs for 128 dots. A total of, for example, 39 LED chips are arranged in line. The 39 driver ICs 4 and 39 driver ICs 5 are also arranged in line beside the LED chips 3.

Also mounted on the circuit board 2 is an electrically erasable programmable ROM (referred to as EEPROM hereinafter) 6 and connector terminals 7. Upon receiving a write signal from a controller 8, the EEPROM 6 stores correction data which is used for correcting the amounts of light emitted from individual LEDs. During printing operation, the EEPROM 6 is connected to the driver ICs 4 and 5 so as to transfer the correction data to the driver ICs 4 and 5.

Figure 2:
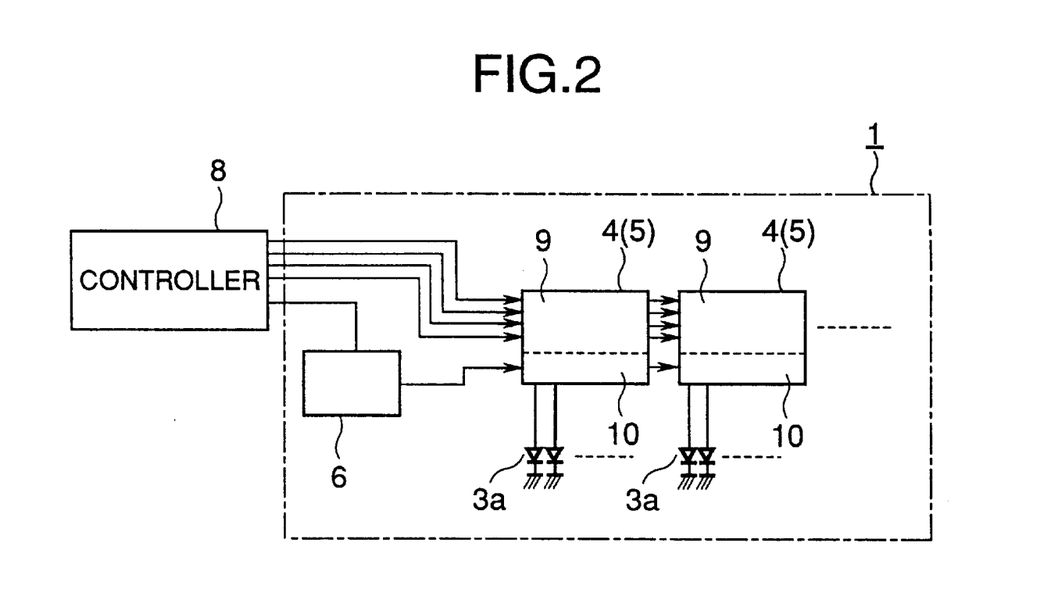
FIG. 2 is a block diagram Illustrating an LED head according to a first embodiment.

FIG. 2 is a block diagram illustrating an LED head according to the first embodiment of the present invention. Referring to FIG. 2, the controller 8 provided on the printer main body sends print data, a clock signal, a latch signal, and a strobe signal to the driver ICs 4 and 5. The controller 8 also outputs a read signal to the EEPROM 6 to read the correction data from the EEPROM 6. The driver ICs 4 and 5 include register latches 9 and current switches 10. The register latches 9 receive the respective signals from the controller 8 and the current switches 10 receive current specifying signals from the EEPROM 6. The driver ICs 4 and 5 are connected to the LEDs 3a in the LED chips 3 so as to drive the individual LEDs 3a in accordance with the print data.

Figure 3:
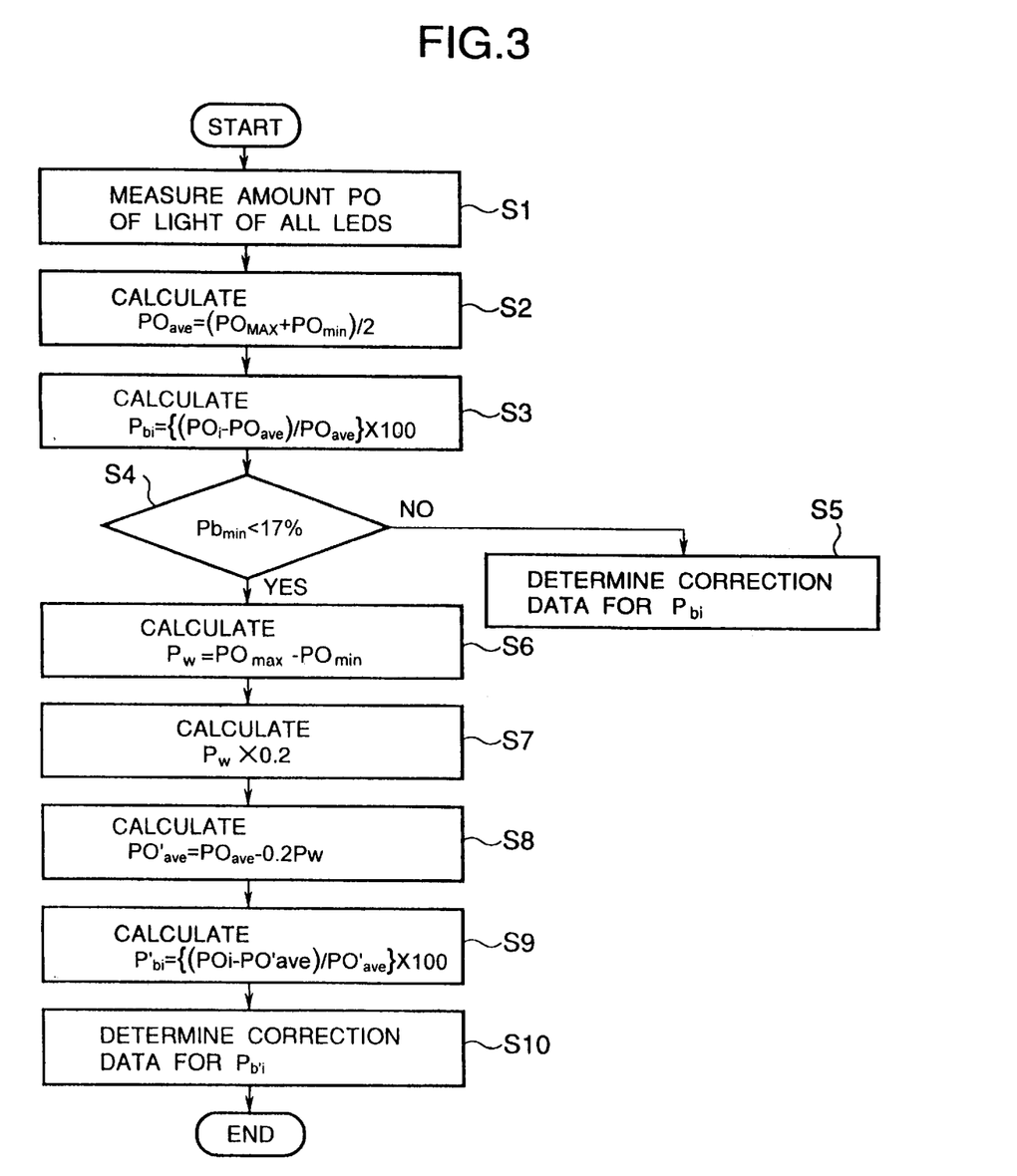
FIG. 3 is a flowchart illustrating the operation of the first embodiment.

FIG. 3 is a flowchart illustrating the operation of the first embodiment.

The operation of the first embodiment will be described with reference to FIG. 3. The LEDs 3a in the respective LED chips 3 are energized one at a time and the amount of light emanating from each LED 3a is measured (step 1). This measurement is performed during the adjustment of the LED head before it is assembled into the printer.

After measuring the amount of emitted light, POi, of each LED 3a, a first correction reference POave is produced. The first correction reference, POave, is the median or mean of the maximum and minimum values of the measured amounts of emitted light POmax and POmin from the LEDs 3a, (step 2).

$$POave=(POmax+POmin)/2 \qquad (1)$$

The percent deviation, Pbi, between the measured amount of light, POi, of each LED 3a and the first correction reference, POave, is determined as follows (step 3):

$$Pbi=\{(POi-POave)/POave\}\cdot 100 \qquad (2)$$

where POi is the amount of light of the i-th LED and Pbi is the difference or deviation between the amount of light from the i-th LED and the first correction reference POave expressed in percent.

In the first embodiment, a correction table having a first correction range and a set of first correction values, as shown in Table I (FIG. 9), is used to correct for the deviations in emitted light from each of the LEDs. The first correction values are selected such that the corrected light values within the first correction range (accuracy) fall within a second predetermined range. In the first embodiment, the first correction values (column 2) are quantized into 16 first sub-divided ranges between upper and lower limits of the first correction range and ranging in correction value from POave−14% of POave to POave+16% of POave in steps of 2% of POave. The resulting accuracy of the corrected light is one-half of a step size or ±1%. Corresponding to the first correction values are respective LED values of uncorrected light, Pbi, shown in column 1, expressed as a percentage deviation from POave. In Table I, the first correction range of percent deviation of the uncorrected LED light is the range lying between −17% and +15% of POave. As will be appreciated by those skilled in the art that Table 1 is merely an example of a correction table. Other correction tables utilizing a different number of sub-divided ranges and having sub-divided ranges of a different size could be used within the spirit and scope of the invention.

Having determined the percent deviations, Pbi, for all of the POi, a check is made (step 4) to determine whether the minimum value percent deviation, Pbmin, is within the first correction range (Pbi=+15% to −17%) in which the amount of light Pbmin can be corrected according to Table I as follows:

$$Pbmin <-17\% \qquad (3)$$

where:

$$Pbmin=\{(POmin-POave)/POave\}\cdot 100 \qquad (3a)$$

If Pbmin is greater than −17% (step 4), the deviations Pbi of the amounts of light, POi, of the LEDs are sub-divided into 16 sub-divided ranges (i.e., −17≦Pbi<−15 to +13≦Pbi≦+15) having increments of 2% according to Table I. The corresponding correction data indicative of the variation of the amount of light emanating from each LED is then stored in the EEPROM 6 (step 5).

If the Pbmin is less than −17% at step 4, the program proceeds to step 6 where the difference, Pw, between the POmax and POmin is determined by the following equation:

$$Pw = POmax - POmin \quad (4)$$

Next, a second correction reference PO'ave is determined which is a value obtained by subtracting a fraction of the Pw (steps 7 and 8) from the first correction reference POave as follows:

$$PO'ave = POave - 0.2 \cdot Pw \quad (5)$$

The selection of the fraction, i.e. 0.2, of Pw will be described later.

Thereafter, differences of deviations Pb'i between the amounts POi of light of the respective LEDs and the second correction reference PO'ave are determined (step 9) as follows:

$$Pb'i = \{(POi - PO'ave)/PO'ave\} \cdot 100 \quad (6)$$

where Pb'i is the percent difference between the light emitted by i-th LED and the second correction reference PO'ave, and POi is the amount of light emitted by the i-th LED.

The correction data is subsequently determined for the respective LEDs according to Table I and stored in the EEPROM 6 (step 10) as described above.

It is to be noted that the size of the sub-divided ranges and corresponding correction values are the same for the first correction range having the first correction reference, POave, and a second (shifted) correction range, having the second correction reference PO'ave. Thus, the content of Table I is used for the cases of step 5 and step 10.

Upon an instruction from the controller 8, the correction data stored in the EEPROM 6 is outputted to the current switches 10 of the driver ICs shown in FIG. 2, so that the current flowing through each of the respective LEDs 3a is individually controlled in accordance with the correction data when the LEDs 3a are driven in accordance with the print data.

As described above, when the Pbmin is not within the first correction range in which the deviations can be corrected according to Table I, the second correction reference PO'ave is determined by decreasing the first correction reference POave by 20% of Pw, the difference between the POmax and POmin. The selection of the fraction of Pw is an experimental value determined to be the maximum possible value where the amounts of light of LEDs close to POmax after correction still will not cause black thin lines to appear in the print. However, the amount of shift is not limited to 20% of the difference between the POmax and POmin. Alternatively, the correction reference may be simply shifted toward the POmin as far as black thin lines will not appear in the print. In this case, the amount of shift is determined by experiment.

According to the first embodiment, if an amount of emitted light is below the lower limit of the first correction range, the second correction reference PO'ave is produced which is closer to the POmin than the first correction reference POave so that the amounts of light that fall in a region below the first correction range may be corrected. In this manner, white thin lines are substantially prevented from appearing in the print result.

Figure 4:
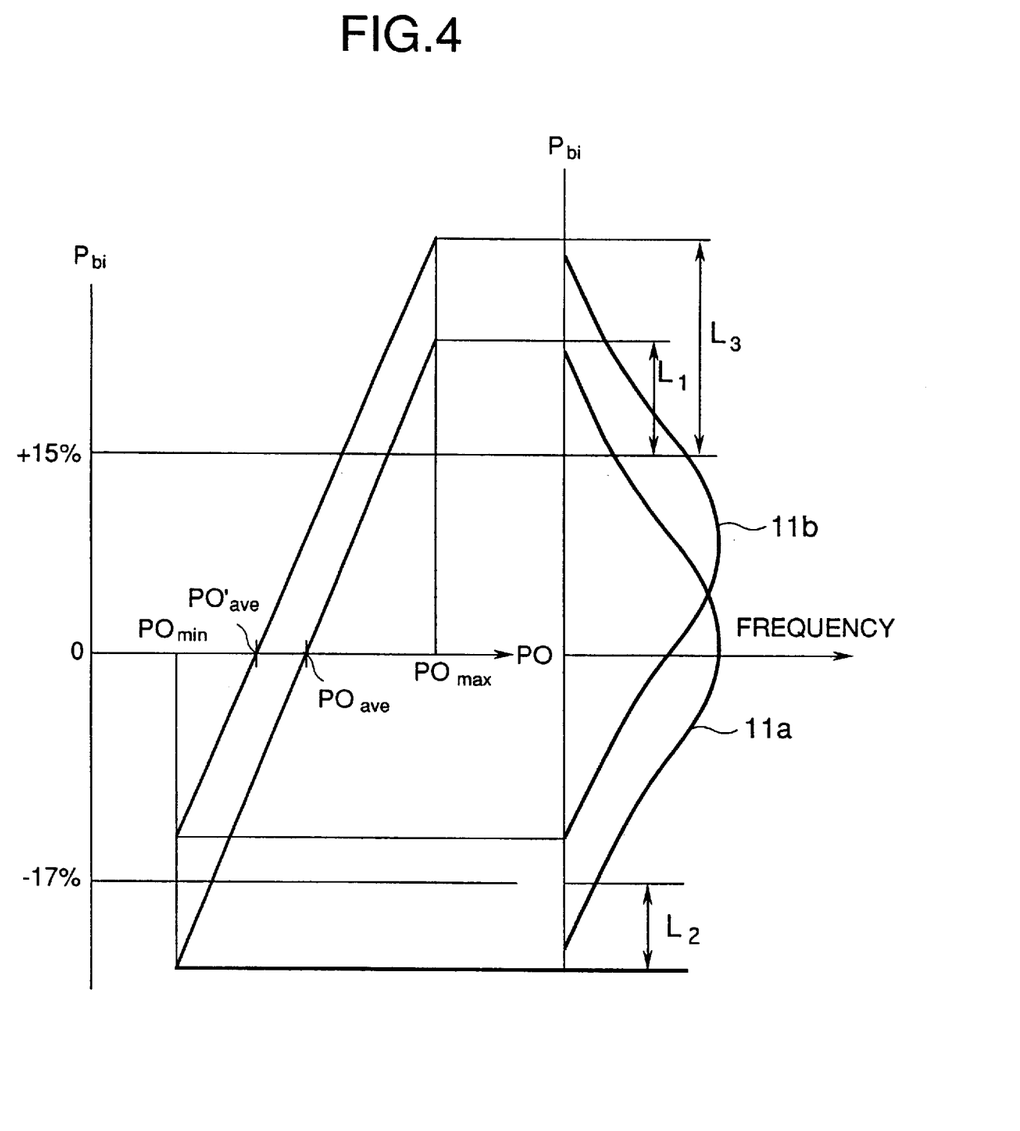
FIG. 4 illustrates the shifting of the correction reference.

FIG. 4 illustrates the shifting of the correction reference, showing the distribution of the amounts of light and the correction ranges before and after the correction reference is shifted. Curve 11a shows the distribution of Pbi before shifting the correction reference and Curve 11b shows the distribution of Pbi after shifting the correction reference. Correction cannot be made for the Pbi in Region L1 which is the higher end portion of the distribution of the Pbi and for the Pbi in Region L2 which is the lower end portion. Shifting the correction reference causes the Pbi in Region L2 to fall within the correction range, but causes the Pbi in Region L3 to be out of the correction range. The Pbi in Region L3 are the sources of black thin lines in the print result. However, black thin lines are not noticeable and will not prominently affect overall print quality.

Second Embodiment

A second embodiment is described with reference to FIGS. 5–8 in which the sub-divided ranges have a first size if they are between the correction reference and a first predetermined value of the amounts of light selected at the 1 σ value of light deviations, and a second size larger than the first size, if they are not between the correction reference and the first predetermined value of light. In the second embodiment, the correction range is effectively widened while still maintaining the same number of levels of the correction data or sub-divided ranges, i.e., 16 sub-divided ranges. The same number of levels of the correction data is maintained for two reasons: (1) an increased number of bits indicative of the levels of the correction data makes the data structure more complex and (2) the circuit configuration of the driver ICs 4 and 5 does not allow increasing of the number of levels.

Figure 5:
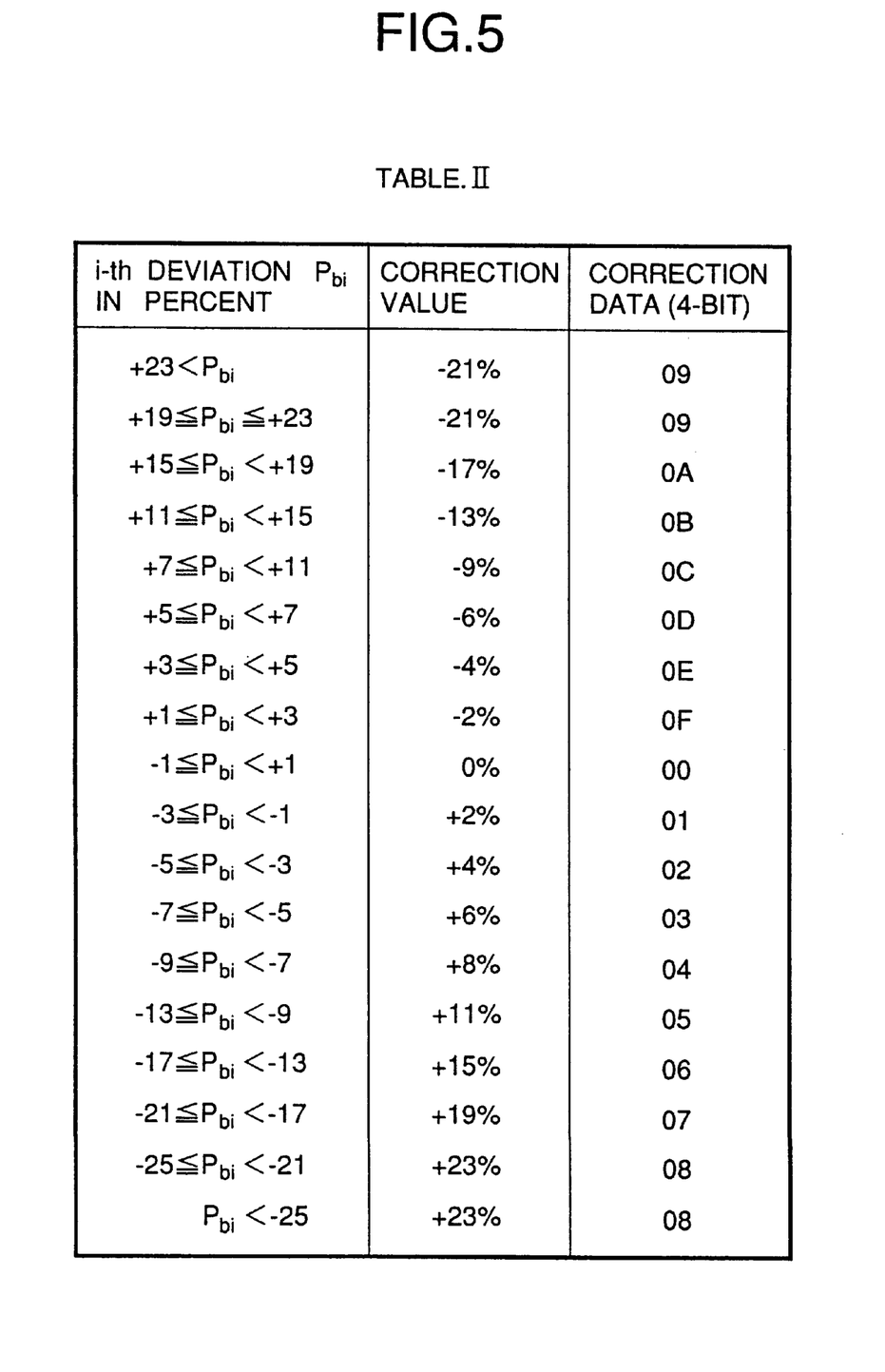
FIG. 5 shows Table II which lists correction values used in a second embodiment.

FIG. 5 shows Table II which lists correction values used in the second embodiment. Referring to Table II, the range in which the deviations Pbi can be corrected is divided into sub-divided ranges whose size is 2% for the deviation Pbi that falls in the range of −9% to +7%, and is 4% for the deviation Pbi that falls in the −25% to −9% and +7% to +23%.

Figure 6:
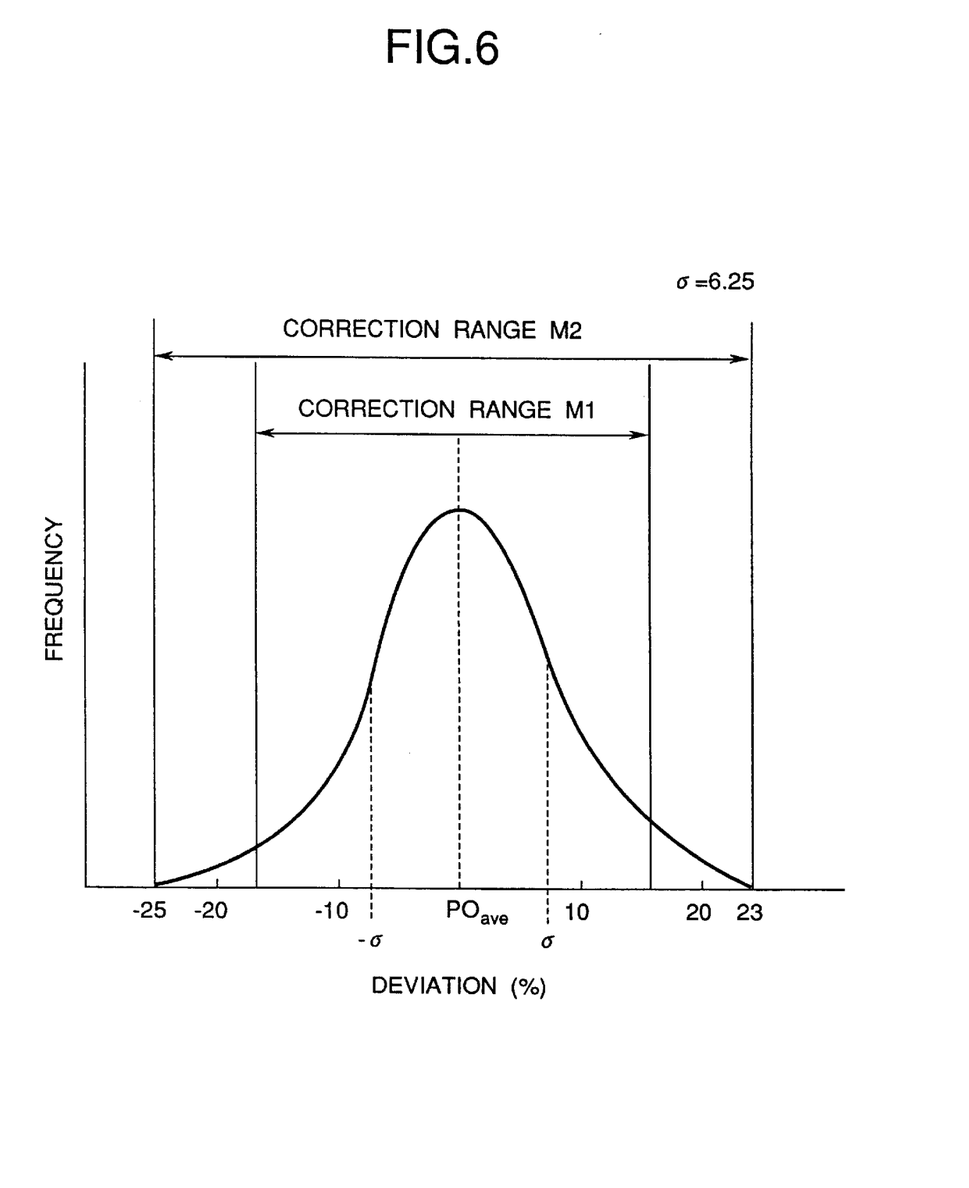
FIG. 6 illustrates the distribution of frequency of the deviations Pbi of an LED head.

FIG. 6 illustrates a frequency distribution of LED light emission of an LED head showing the correction range M2 where the deviation Pbi can be corrected in the second embodiment and showing the correction range M1 where the deviation Pbi can be corrected in the first embodiment. FIG. 6 plots deviation of the amount of light as abscissa and frequency of occurrence as the ordinate. Referring to FIG. 6, the correction range M2 for the second embodiment is wider than that M1 for the first embodiment. In other words, the second embodiment is capable of correcting variations on the higher and lower ends of the frequency distribution. The LED head having the distribution shown in FIG. 6 has a total of 4,992 dots (LEDs) with the maximum percent deviation, Pbmax=+23%, the minimum percent deviation, Pbmin=−25%, and a standard deviation σ=6.25. The correction range, shown in FIG. 5, in which deviations Pbi are corrected, includes two different sizes of subdivided ranges. The size of the sub-divided ranges is 2% for $-\sigma \leq Pbi \leq +\sigma$ and 4% for $Pbi < -\sigma$ and $Pbi > +\sigma$.

The construction of the LED head used in the second embodiment is the same as that of the first embodiment.

Figure 7:
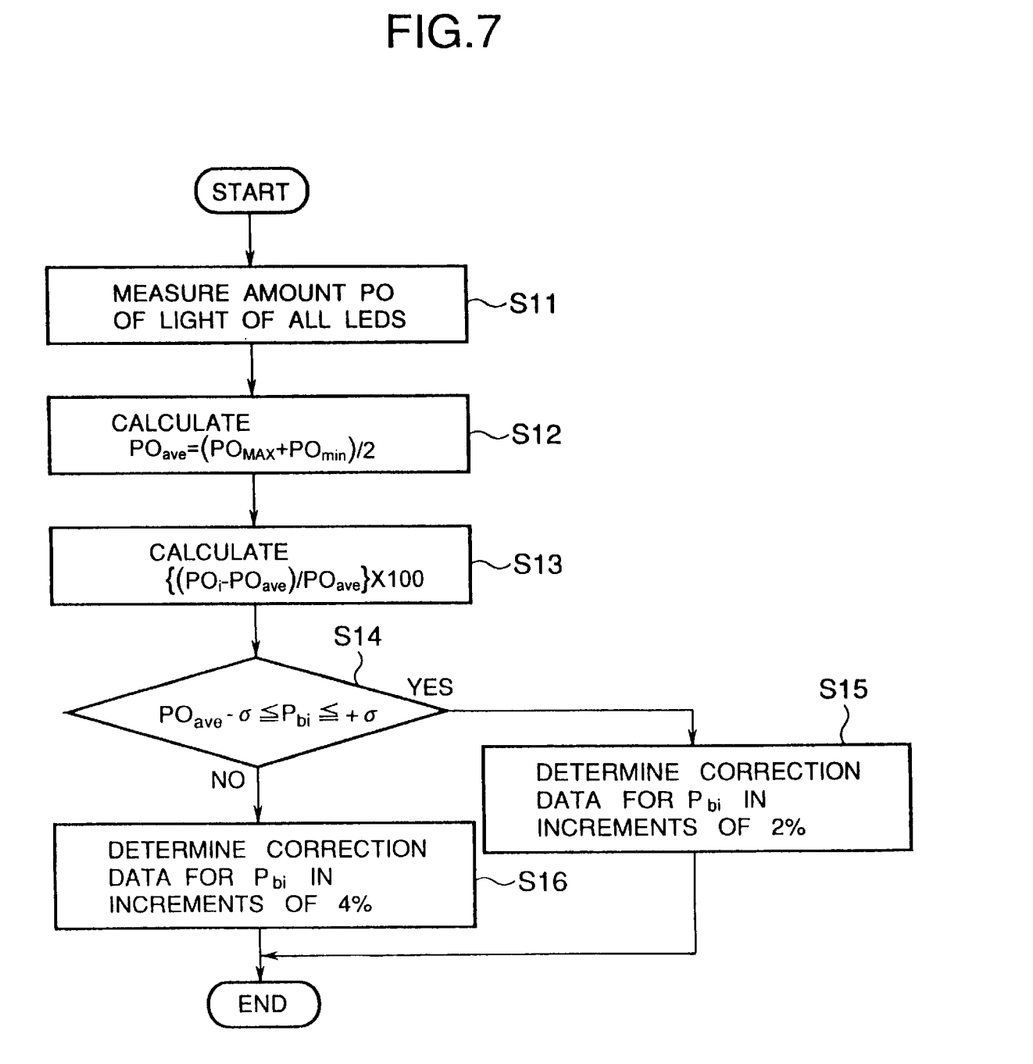
FIG. 7 is a flowchart showing the operation of the second embodiment.

FIG. 7 is a flowchart illustrating the operation of the second embodiment. The operation of the second embodiment will be described with reference to FIG. 7.

The LEDs 3a of the LED chips 3 are energized one at a time and the amounts, POi, of light emanating from each of the LEDs 3a are measured (step 11). After the amounts of light from all the LEDs 3a have been measured, a correction reference, POave, is determined on the basis of a maximum value POmax and a minimum value POmin (step 12) of emitted light from the LEDs 3a. The correction reference POave is calculated by Equation (1) just as in the first embodiment. Then, the percent deviations, Pbi, of the amounts of light of the respective LEDs 3a from the correction reference POave are calculated using Equation (2) (step 13). Next, the deviations, Pbi, of the respective LEDs are arranged in 16 sub-divided ranges according to Table II in FIG. 5, the respective deviations, Pbi, are translated into 4-bit correction data (steps 14–16) and the correction data stored into the EEPROM 6.

When performing a printing operation, just as in the first embodiment, the correction data stored in the EEPROM 6 is outputted to the current switches 10 of the driver ICs 4 and 5 shown in FIG. 2 so as to individually control the current flowing through the respective LEDs 3a which are driven in accordance with the print data.

Figure 8:
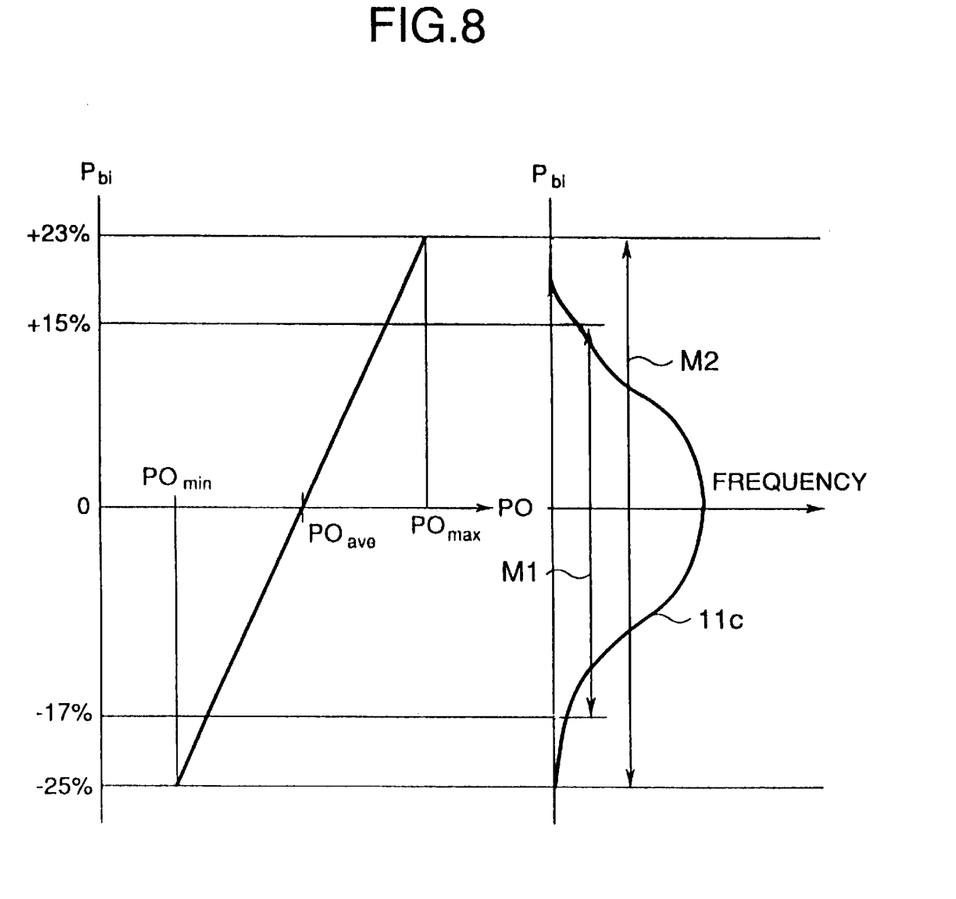
FIG. 8 illustrates the distribution of deviations Pbi and the ranges in which correction is made.

FIG. 8 illustrates the distribution of the deviations Pbi and the correction ranges M1 and M2 in which the amounts of light are corrected. As shown in FIG. 8, the correction range can be extended from M1 (which covers −17% to +15%) for the first embodiment, to M2 (which covers −25% to +23%) for the second embodiment. If the method of embodiment two (or embodiment one with the correction reference adjusted toward Pbmin) is not applied, an LED head with a distribution depicted by Curve 11c, having LEDs with deviations Pbi below the lower limit of M1, would result in changes in the density of printed dots, causing white thin lines in the printed dots. LEDs whose amount of emitted light falls in the range M2 in the second embodiment would not result in white thin lines.

In this manner, the amounts of light for the respective dots are corrected. According to the second embodiment, the deviations Pbi in the range of −9% to +7% will be corrected so that deviations after correction are within ±1%, and the deviations Pbi in the ranges of −25% to −9% and +7% to +23% will be corrected so that deviations after correction are within ±2%.

In the second embodiment, as mentioned above, the size of sub-divided ranges is as small as 2% in the vicinity of the correction reference POave and as large as 4% in the region away from the correction reference POave. This is due to the fact that the variation of the amount of light varies rapidly near the correction reference POave as is clear from FIG. 6 and therefore correction values in large increments are desirable in achieving overall print quality. The size of sub-divided ranges is small for −σ<Pbi<+σ and large for Pbi<−94 and Pbi>+σ. Switching sub-divided ranges from one size to another allows the variations in the amount of light to be corrected over a wider range of distribution while still maintaining the substantial definition of the overall print.

The second embodiment yields a greater correction range than the first embodiment, so that an LED head having large variations in the amount of light emitted from the respective LEDs can still provide, after correction, desired print quality without significant variations in density of the print.

Modifications of the second embodiment may be made in a variety of forms. For example, the sub-divided ranges or correction values may be provided in a larger number of levels in different increments of, for example, 2%, 3%, and 4% in accordance with the frequency of distribution, so that the correction values are gradually changed. Providing many different increments is effective in maintaining definition of overall print. The second embodiment accommodates larger variations of the amounts of light emitted from the LEDs, improving yield of manufactured LED heads.

The first and second embodiment can be combined for further advantages. In other words, white thin lines in the print can further be decreased and a wider correction range can be obtained, if the feature of shifting from one correction reference to another in the first embodiment is combined with the feature of switching from one size of sub-divided range or increment of the correction values to another.

What is claimed is:

1. A method of correcting an amount of light emitted from each of a plurality of light emitting elements, comprising the steps of;

measuring the amount of light emitted from each of the plurality of light emitting elements and determining a minimum value and a maximum value thereof;

defining a first correction reference on the basis of the amount of light emitted from each of the plurality of light emitting elements;

defining a first correction range having an upper limit and a lower limit, the first correction reference being substantially in the middle of the first correction range, the first correction range including a predetermined number of first sub-divided ranges between the upper limit and the lower limit, the first correction range being such that a first difference between the first correction reference and the amount of light emitted from each of the plurality of light emitting elements in the first correction range falls within a first predetermined range;

determining whether the minimum value of the amount of light is within the first correction range;

wherein if the minimum value of the amount of light is within the first correction range, the method further includes the steps of:

determining a first correction value for each of the corresponding first sub-divided ranges, the first correction value being such that the first difference between the first correction reference and the amount of light emitted from each of the light emitting elements in the first correction range after correction is within a second predetermined range; and correcting the amount of light emitted from each of the light emitting elements in each of the first sub-divided ranges in accordance with the first correction value;

wherein if the minimum value of the amount of light is not within the first correction range, the method further includes the steps of:

defining a second correction range, the second correction range being defined by shifting the first correction range toward the minimum value by a predetermined quantity, the second correction range having a predetermined number of second sub-divided ranges and a second correction reference which is obtained by shifting the first correction reference by the predetermined quantity toward the minimum value;

determining a second correction value for each of the second sub-divided ranges, the second correction value being such that a second difference between the second correction reference and the amount of light emitted from each of the emitting elements in the second correction range after correction is within the second predetermined range; and correcting the amount of light of each of the light emitting elements in each of the second sub-divided ranges in accordance with the second correction value.

2. The method according to claim 1, wherein the predetermined quantity is a fraction of a difference between the maximum and the minimum values of the amount of light emitted from each of the plurality of light emitting elements.

3. The method according to claim 1, wherein the first correction reference is determined based on the minimum value and the maximum value of the amount of light emitted from the plurality of light emitting elements.

4. The method according to claim 1, wherein the first correction value is for increasing the amount of light emitted from each light emitting element if the amount of light emitted by the respective each light emitting element falling in the first sub-divided range is smaller than the first correction reference; and the first correction value is for decreasing the amount of light emitted from each light emitting element if the amount of light emitted by the respective each light emitting element falling in the first subdivided range is larger than the first correction reference.

5. The method according to claim 1, wherein the predetermined quantity is 20% of a difference between the minimum value and the maximum value of the amount of light emitted from the plurality of light emitting elements.

6. The method according to claim 1 wherein the second correction range includes the minimum value.

7. A method of correcting an amount of light emitted from each of a plurality of light emitting elements, comprising the steps of:

measuring the amount of light emitted from each of the plurality of light emitting elements and determining a maximum value and a minimum value of the amount of light thereof;

defining a correction reference on the basis of the amount of light emitted from each of the plurality of light emitting elements;

defining a correction range having an upper limit and a lower limit, the correction reference being substantially in the middle of the correction range, the correction range being such that a difference between the correction reference and the amount of light emitted from each of the plurality of light emitting elements in the correction range falls within a first predetermined range, the correction range including a predetermined number of sub-divided ranges;

determining a correction value for each of the sub-divided ranges, the correction value being such that the difference between the correction reference and the amount of light emitted from each of the emitting elements in the correction range after correction is within a second predetermined range, the sub-divided ranges having progressively larger size as the upper limit and the lower limit of the correction range are approached; and correcting the amount of light from each of the light emitting elements in each of the sub-divided ranges in accordance with the correction value.

8. The method according to claim 7, wherein the sub-divided ranges have a first size if they are between the correction reference and a first predetermined value of the amount of light from each light emitting element, and a second size larger than the first size if the sub-divided ranges are not between the correction reference and the first predetermined value of the amount of light from each light emitting element.

9. The method according to claim 7, wherein the correction range includes the minimum and maximum value.

10. The method according to claim 7, wherein the correction reference is determined on the basis of the minimum value and the maximum value of the amount of light emitted from the plurality of light emitting elements.

11. The method according to claim 7, wherein the correction value is for increasing the amount of light emitted from each of the light emitting elements if the amount of light emitted by each respective light emitting element falling in the sub-divided range is smaller than the correction reference; and the correction value is for decreasing the amount of light emitted from each of the light emitting elements if the amount of light in the sub-divided range is larger than the correction reference.

* * * * *